United States Patent
Todani et al.

(10) Patent No.: US 8,206,016 B2
(45) Date of Patent: Jun. 26, 2012

(54) HEADLIGHT OPTICAL AXIS ADJUSTMENT DEVICE

(75) Inventors: Akinobu Todani, Iida (JP); Toshinori Origane, Iida (JP)

(73) Assignee: OMRON Automotive Electronics Co., Ltd., Aichi (JP)

(*) Notice: Subject to any disclaimer, the term of this patent is extended or adjusted under 35 U.S.C. 154(b) by 825 days.

(21) Appl. No.: 12/241,315

(22) Filed: Sep. 30, 2008

(65) Prior Publication Data

US 2009/0086496 A1 Apr. 2, 2009

(30) Foreign Application Priority Data

Oct. 1, 2007 (JP) ................................ 2007-257966

(51) Int. Cl.
*B60Q 1/00* (2006.01)
*F21V 21/28* (2006.01)
(52) U.S. Cl. .................... 362/464; 362/465; 362/466
(58) Field of Classification Search .......... 362/464–465, 362/466
See application file for complete search history.

(56) References Cited

U.S. PATENT DOCUMENTS 3,603,785 A * 9/1971 Baker ........................... 362/467
6,450,673 B1 * 9/2002 Toda et al. ..................... 362/465

FOREIGN PATENT DOCUMENTS

CN 1413858 4/2003

OTHER PUBLICATIONS

CN patent application No. 2008101659491, First Office Action mailed Dec. 18, 2009.

* cited by examiner

*Primary Examiner* — Diane Lee
*Assistant Examiner* — Sean Gramling
(74) *Attorney, Agent, or Firm* — Weaver Austin Villeneuve & Sampson LLP (57) ABSTRACT

The present invention aims to perform optical axis adjustment while a vehicle is stopped only in necessary situations and to avoid unnecessary adjustment, and to further enhance durability. A headlight optical axis adjustment device for adjusting an optical axis of a headlight based on a pitch angle of the vehicle includes an opened/closed state detection section for detecting an open/closed state of an open/close unit where the opened state is when a passenger gets on/out or when a baggage is being loaded/unloaded to and from the vehicle; and an optical axis adjustment permitting section for permitting optical axis adjustment of the headlight based on the pitch angle of the vehicle when the opened state of the open/close unit is detected by the opened/closed state detection section.

2 Claims, 8 Drawing Sheets

HEADLIGHT OPTICAL AXIS ADJUSTMENT DEVICE

BACKGROUND OF THE INVENTION

1. Technical Field

The present invention relates to a headlight optical axis adjustment device also referred to as "auto levelizer" used in vehicles such as an automobile.

2. Related Art

According to provision of safety standard (Department of Transportation Law No. 67, Jul. 28, 1951) of Road Trucking Vehicle Law, vehicles such as automobiles (hereinafter referred to as a vehicle) must be provided with a "running headlight" (so-called high beam) and a "passing headlight" (so-called low beam), or a "light distribution variable headlight" which is a combination of the above (combination of high beam and low beam).

The "running headlight" is provided to check obstructions in terms of traffic at a front side of the vehicle at night, and the "passing headlight" is provided, in addition to such requirement, such that an irradiating light beam does not inhibit other traffics (i.e., not to dazzle the drivers of oncoming vehicles and pedestrians).

Although such "running headlight" and "passing headlight" are respectively independent lighting tools, most of the recent vehicles include the "light distribution variable headlight", that is, a headlight for automatically adjusting luminosity of the irradiating light beam and spatial distribution in a relevant direction according to a traveling state at night, and thus the description will be made herein using the "light distribution variable headlight" by way of example. It should be noted that such lighting tools are not distinguished in the concept of the invention.

A driver switches the optical axis of the headlight to either "high beam" or "low beam" depending on the situation when traveling the vehicle at night. Specifically, the driver switches to "high beam" to have the optical axis of the headlight to an upper side (more precisely, horizontal) so as to be able to see sufficiently well the distance in a situation where oncoming vehicles or pedestrians are not present, whereas the driver switches to "low beam" to have the optical axis of the headlight slightly to a lower side so as not to dazzle the drivers of oncoming vehicles and pedestrians in a situation where oncoming vehicles or pedestrians are present.

The brightness and the optical axis of the headlight are test objects of automobile inspection, where an irradiation distance of high beam is generally adjusted to about 100 m towards the front of the vehicle body, and the irradiation distance of low beam is adjusted to about 40 m, and in particular, in a recent high luminance headlight (typically using a metal halide lamp, and normally referred to as an HID lamp), the demand on the adjustment of the bright and dark boundary line (also referred to as a cutoff line) of the beam distribution (particularly low beam) is becoming stricter as even slight optical axis shift greatly dazzles drivers of oncoming vehicles and the like.

Figure 11:
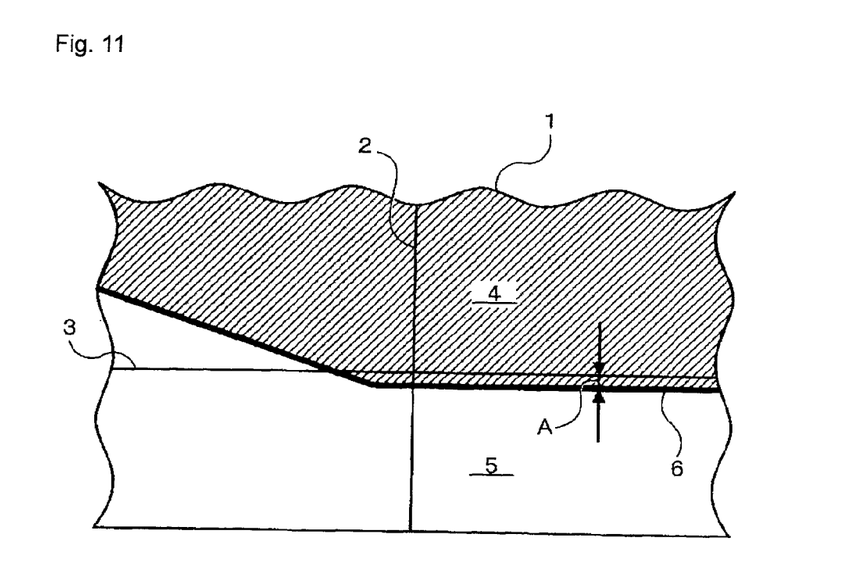
FIG. 11 shows a conceptual view of a satisfactory light distribution.

FIG. 11 shows a conceptual view of a satisfactory light distribution. In the figure, a vertical line 2 indicating a center of the vehicle, and a horizontal line 3 indicating a height of the headlight of the vehicle (height of the center of optical axis) are drawn on a wall surface 1 positioned at a predetermined distance (10 m herein) to the front of the vehicle (not shown). A hatched portion of the wall surface 1 shows a dark part 4 not illuminated with the headlight, and a white portion other than the hatched portion shows a bright part 5 illuminated with the headlight. A boundary line shown with a heavy light between the dark part 4 and the bright part 5 is a cutoff line 6. The cutoff line 6 spreads slightly to the upper side at the portion on a left side of the vertical line 2 indicating the center of the vehicle, but this is a devise on light distribution so that pedestrians on the left side can be easily found and corresponds to a traveling zone (left-hand traffic) of Japan. Therefore, this devise will obviously be reversed in foreign countries of right-hand traffic.

An aspect to be noted in the figure is that the cutoff line 6 is positioned slightly on the lower side of the horizontal line 3 indicating the height of the headlight excluding a pedestrian portion. Suppose a difference A in the height direction between the horizontal line 3 and the cutoff line is 4.4 cm for convenience, since the wall surface 1 is positioned at 10 m in front of the vehicle, it is 4.4 cm×50 m/10 m=22 cm at the position of 50 m in front of the vehicle, and thus the cutoff line lowers by 22 cm at the 50 m spot. The relevant lowering amount (22 cm) is a sufficient value to prevent dazzling on oncoming vehicles, and also illuminates obstructions at the 50 m spot without trouble.

If a number of passengers or an amount of load of the vehicle are changed even if the cutoff line is appropriately set as above, the cutoff line moves to the upper side, which may dazzle the drivers of oncoming vehicles and the like. This tendency is significant in vehicles such as a minivan, where a great number of seats are provided, and a change in the number of passengers or a change in the load are large.

An auto levelizer (hereinafter referred to as a headlight optical axis adjustment device) for automatically adjusting the optical axis of the headlight to obtain the correct light distribution is thus used. The headlight optical axis adjustment device tilts and adjusts the optical axis of the headlight in a direction of canceling a pitch angle based on the tilt (hereinafter also referred to as a pitch angle) in the front and back direction of the vehicle. In a vehicle mounted with such device, the optical axis of the head light is automatically adjusted to return to the correct light distribution when the number of passengers or the amount of load of the vehicle are changed, and thus the irradiating light beam is prevented from inhibiting other traffics while checking the traffic obstructions at the front of the vehicle at night.

However, the pitch angle of the vehicle finely fluctuates not only when the number of passengers or the amount of load are changed, but also when the passengers goes in/out or when the baggage is being loaded/unloaded to and from the vehicle, and also fluctuates when accelerating or decelerating during traveling or riding over bumps of the road surface. Thus, an optical axis adjustment mechanism of the headlight operates every time the pitch angle changes if the device simply "tilts and adjusts the optical axis of the headlight in a direction of canceling the pitch angle of the vehicle", and thus operation frequency of actuators such as a motor arranged in the mechanism increases thereby inhibiting durability.

Japanese Unexamined Patent Publication No. 2000-103280 (Japanese Patent No. 3849960) is known as a conventional art for solving such problem. This publication will be hereinafter referred to as a first conventional art, where in the first conventional art, a tilt adjustment of the optical axis of the headlight based on the pitch angle of the vehicle is performed once while the vehicle is stopped, and thereafter, the tilt adjustment is performed for every predetermined interval while the vehicle is stopped. The tilt adjustment of the optical axis of the headlight is thus performed limited to only while the vehicle is stopped, and the number of operations of the actuator such as the motor is reduced and the durability is enhanced.

Japanese Unexamined Patent Publication No. 2000-85458 (Japanese Patent No. 3847972) is also known as another conventional art for solving the above problem. This publication will be hereinafter referred to as a second conventional art, where in the second conventional art, the tilt adjustment of the optical axis of the headlight based on the pitch angle of the vehicle is performed while the vehicle is stopped, and the title adjustment of the optical axis of the headlight is performed based on the pitch angle of when stably traveling instead of the pitch angle of when the vehicle is stopped if the difference between the pitch angle of when stably traveling and the pitch angle of when stopped exceeds a predetermined value while the vehicle is stably traveling (constant speed travel that does not involve acceleration and deceleration of greater than or equal to 30 Km per hour). In this case as well, the tilt adjustment of the optical axis particularly in traveling is limited to being performed only "if the difference between the pitch angle of when stably traveling and the pitch angle of when stopped exceeds a predetermined value", and thus the number of operations of the actuator such as the motor is reduced and the durability is enhanced.

SUMMARY

In a first and second conventional arts, however, unnecessary operations of an actuator still exist, and a further improvement is desired in terms of further enhancing durability.

In other words, in the first conventional art, a tilt adjustment of an optical axis of a headlight based on a pitch angle of a vehicle is performed once while the vehicle is stopped and the tilt adjustment is performed for every predetermined interval while the vehicle remains stopped, but at least one tilt adjustment and the tilt adjustment of every interval are performed even in a stable state where the passenger does not go in/out and the baggage is not being loaded/unloaded, and thus the adjustments are waste, and improvement is desired in terms of further enhancing the durability.

In the second conventional art, the tilt adjustment of the optical axis is performed both while the vehicle is stopped and while it is traveling at a steady rate, but as there is no limitation (one adjustment and adjustment of every interval) as in the first conventional art while the vehicle is stopped, the actuator such as the motor operates every time the pitch angle changes, and unnecessary tilt adjustment is frequently performed even when the passenger goes in/out or when the baggage is being loaded/unloaded, and thus improvement is desired in terms of further enhancing the durability.

The present invention aims to provide a headlight optical axis adjustment device which avoids unnecessary adjustment by performing optical adjustment while the vehicle is stopped only in necessary situations, thereby further enhancing the durability.

In accordance with a first aspect of the present invention, the present invention relates to a headlight optical axis adjustment device for adjusting an optical axis of a headlight based on a pitch angle of a vehicle; the headlight optical axis adjustment device including an opened/closed state detection section for detecting an opened/closed state of an open/close unit where the opened state is when a passenger gets in/out or when a baggage is being loaded/unloaded to and from the vehicle; and an optical axis adjustment permitting section for permitting optical axis adjustment of the headlight based on the pitch angle of the vehicle when the opened state of the open/close unit is detected by the opened/closed state detection section.

In accordance with a second aspect of the present invention, the present invention relates to the headlight optical axis adjustment device according to the first aspect of the present invention, further including a behavior detection section for detecting a behavior change of the vehicle necessary for calculating the pitch angle; wherein the optical axis adjustment permitting section permits the optical axis adjustment of the headlight based on the pitch angle of the vehicle when the opened state of the open/close unit is detected by the opened/closed state detection section, and a detection value of the behavior detection section is greater than a predetermined value.

In accordance with a third aspect of the present invention, the present invention relates to a headlight optical axis adjustment device for adjusting an optical axis of a headlight based on a pitch angle of a vehicle; the headlight optical axis adjustment device including an opened/closed state detection section for detecting an opened/closed state of an open/close unit where the opened state is when a passenger gets in/out or when a baggage is being loaded/unloaded to and from the vehicle; and an optical axis setting section for prohibiting the optical axis adjustment of the headlight based on the pitch angle of the vehicle when the opened state of the open/close unit is detected by the opened/closed state detection section, and setting the optical axis of the headlight to a predetermined angle so as not to dazzle the drivers of oncoming vehicles and pedestrians.

In accordance with a fourth aspect of the present invention, the present invention relates to the headlight optical axis adjustment device according to the third aspect of the present invention, further including a behavior detection section for detecting a behavior change of the vehicle necessary for calculating the pitch angle; wherein the optical axis setting section sets the optical axis of the headlight to the predetermined angle so as not to dazzle the drivers of oncoming vehicles and the pedestrians when the opened state of the open/close unit is detected by the opened/closed state detection section, and a detection value of the behavior detection section is greater than a predetermined value.

In accordance with a fifth aspect of the present invention, the present invention relates to a headlight optical axis adjustment device for adjusting an optical axis of a headlight based on a pitch angle of a vehicle; the headlight optical axis adjustment device including an opened/closed state detection section for detecting an opened/closed state of an open/close unit where the opened state is when a passenger gets in/out or when a baggage is being loaded/unloaded to and from the vehicle; a behavior detection section for detecting a behavior change of the vehicle necessary for calculating the pitch angle; a calculation section for calculating a difference between a scheduled amount of optical axis adjustment for this time based on the pitch angle and an optical axis adjustment amount for a previous time when the closed state of the open/close unit is detected by the opened/closed state detection section, and a time a detection value of the behavior detection section is greater than a predetermined value elapses a predetermined time; and a first optical axis adjustment execution section for executing the optical axis adjustment according to the scheduled amount of the optical axis adjustment for this time if the value of the difference calculated by the calculation section is greater than a predetermined value.

In accordance with a sixth aspect of the present invention, the present invention relates to the headlight optical axis adjustment device according to the fifth aspect of the present invention, wherein the first optical axis adjustment execution section does not execute further optical axis adjustment when executed number of times of the optical axis adjustment becomes greater than a predetermined number of times.

In accordance with a seventh aspect of the present invention, the present invention relates to a headlight optical axis adjustment device for adjusting an optical axis of a headlight based on a pitch angle of a vehicle; the headlight optical axis adjustment device including an opened/closed state detection section for detecting an opened/closed state of an open/close unit where the opened state is when a passenger gets in/out or when a baggage is being loaded/unloaded to and from the vehicle; a behavior detection section for detecting a behavior change of the vehicle necessary for calculating the pitch angle; and a second optical axis adjustment execution section for executing an adjustment of the optical axis based on the pitch angle both when the opened state of the open/close unit is detected by the opened/closed state detection section and when the closed state of the open/close unit is detected by the opened/closed state detection section; wherein the second optical axis adjustment execution section executes the adjustment of the optical axis based on the pitch angle when judging whether or not the detection value of the behavior detection section is greater than a first predetermined value (Hopen) for the opened state and judged as being greater if the opened state of the open/close unit is detected by the opened/closed state detection section, and executes the adjustment of the optical axis based on the pitch angle when judging whether or not the detection value of the behavior detection section is greater than a second predetermined value for the closed state and judged as being greater if the closed state of the open/close unit is detected by the opened/closed state detection section.

According to the present invention, the optical axis adjustment of the headlight based on the pitch angle of the vehicle is permitted only when the opened/closed state of the open/close unit such as doors is in the "opened state", where the opened state is when the passenger goes in/out or when the baggage is being loaded/unloaded to and from the vehicle, and thus the optical axis adjustment while the vehicle is stopped is performed only in necessary situations and unnecessary adjustment can be avoided, and further enhancement in the durability of the optical axis adjustment actuator (such as the motor) can be achieved.

DETAILED DESCRIPTION

Hereinafter, embodiments of the present invention will be described based on the drawings.

Figure 1:
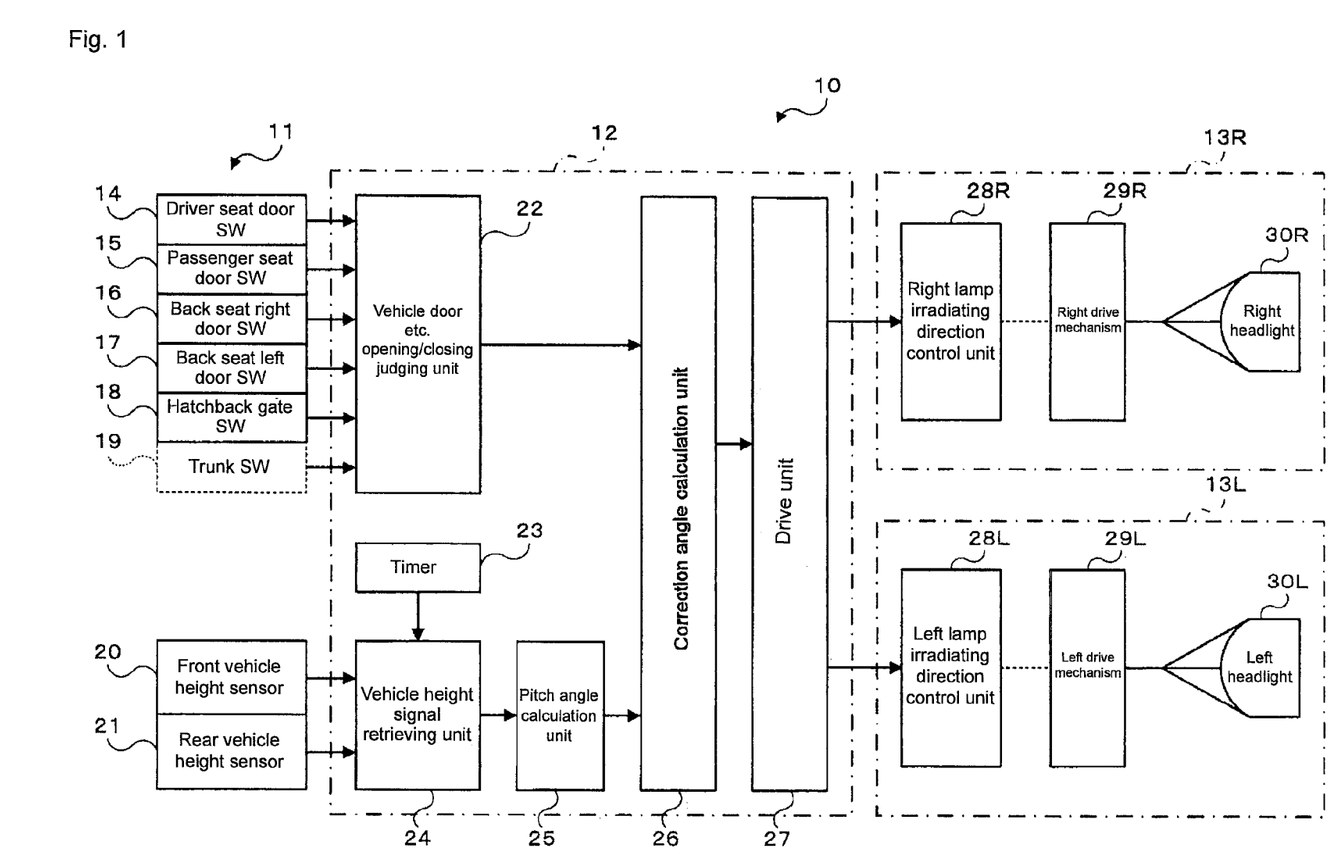
FIG. 1 shows a block diagram of a headlight optical axis adjustment device according to an embodiment.

FIG. 1 shows a block diagram of a headlight optical axis adjustment device according to an embodiment. In the figure, a headlight optical axis adjustment device 10 is configured including a switch and sensor group 11, a leveling controller 12, a right lamp assembly (hereinafter abbreviated as ASSY) 13R, and a left lamp ASSY 13L.

Describing the details of each unit, the switch and sensor group 11 includes a driver seat door switch (switch is abbreviated as "SW" in the figure) 14 for detecting opening/closing of a driver seat door, a passenger seat door switch 15 for detecting the opening/closing of a passenger seat door, a back seat right door switch 16 for detecting the opening/closing of a back seat right door, a back seat left door switch 17 for detecting the opening/closing of a back seat left door, a hatchback gate switch 18 for detecting the opening/closing of a hatchback gate, and a front vehicle height sensor 20 and a rear vehicle height sensor 21 for detecting the vehicle height near a front and back axles, respectively, as a behavior change amount of the vehicle necessary for calculating a pitch angle θ. Here, the hatchback gate is the door of the rear baggage compartment in a minivan and the like. In passenger cars and the like, a trunk is provided in place of the hatchback gate, and thus a trunk switch 19 is arranged in place of the hatch gate switch 18 when the headlight optical axis adjustment device 10 in the present embodiment is applied to the passenger car and the like. Unless particularly stated, the hatchback gate switch 18 and the trunk switch 19 may be similarly handled to detect the opening/closing of the baggage compartment door. The door, the gate, and the trunk have different names, but functions are common in being an open/close unit which is used when the passenger goes in/out or when the baggage is being loaded/unloaded, and thus the door, the gate, and the trunk are collectively referred to herein as a "door" or "door etc.".

The front vehicle height sensor 20 and the rear vehicle height sensor 21 are sensors for detecting the vehicle height near the front and back axles, respectively, and the preferred attachment positions are as described below.

Figure 2:
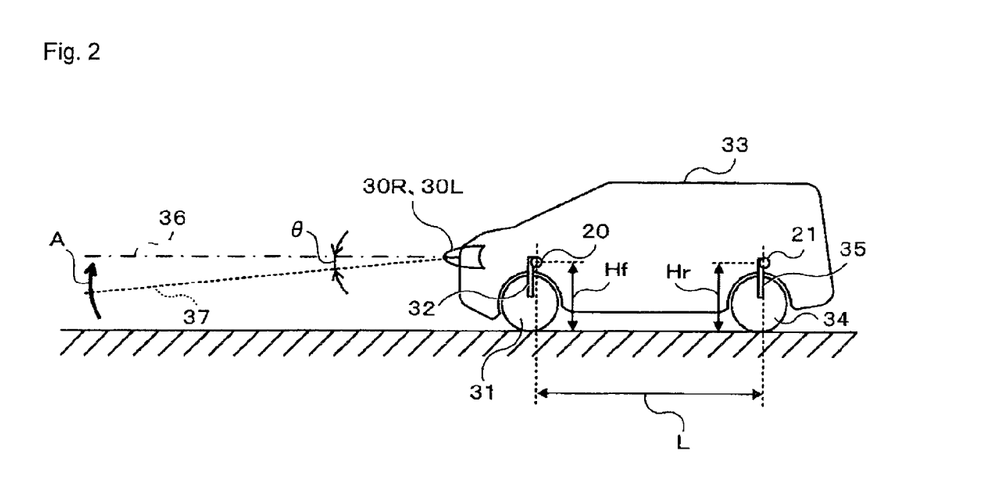
FIG. 2 shows a view of attachment positions of vehicle height sensors 20, 21.

FIG. 2 shows a view of attachment positions of the vehicle height sensors 20, 21. In the figure, the front vehicle height sensor 20 is attached to a connection point of a suspending device 32 of a front wheel 31 and a vehicle body 33, and the rear vehicle height sensor 21 is attached to a connection point of a suspending device 35 of a rear wheel 34 and the vehicle body 33.

The front and rear suspending devices 32, 35 elastically suspend the front and rear wheels 31, 34 with respect to the vehicle body 33, where an entire length of the respective suspending devices 32, 35 changes when the load of the front and rear wheels 31, 34 fluctuates or when the front and rear wheels 31, 34 ride over a bump of a road surface, thereby alleviating and absorbing fluctuation of the load and a ride-over shock of the bump.

The pitch angle θ of the vehicle is an angle formed by an actual horizontal line (hereinafter referred to as actual horizontal line) 37 in the front and back direction of the vehicle body 33 with respect to a horizontal line (horizontal line passing through the optical axis of a left and right headlight 30R, 30L in the figure, hereinafter also referred to as a reference horizontal line) 36 that becomes a reference in the front and back direction of the vehicle body 33. The pitch angle θ is obtained as a slope of the actual horizontal line 37 based on a direction and a magnitude of a change in a detection value Hf of the front vehicle height sensor 20 and a detection value Hr of the rear vehicle height sensor 21 on the basis of Hf and Hr when the reference horizontal line 36 is obtained, where Hf is the detection value of the front vehicle height sensor 20 and Hr is the detection value of the rear vehicle height sensor 21.

For instance, if the vehicle height (Hr) on the rear wheel side does not change and only the vehicle height (Hf) on the front wheel side changes in the increasing direction, the pitch angle θ decreases or increases in a positive direction, the slope of the actual horizontal line 37 changes in the direction of an arrow A, and the optical axes of the left and right headlights 30R, 30L become horizontal or turned to an upper side. Alternatively, if the vehicle height (Hf) on the front wheel side does not change and only the vehicle height (Hr) on the rear wheel side changes in the decreasing direction, the optical axes of the left and right headlights 30R, 30L become horizontal or turned to the upper side, thereby dazzling oncoming vehicles and pedestrians in both cases.

The pitch angle θ is obtained from the following equation (1) where L is a spacing (spacing in front and back direction of the vehicle: wheel base width) between the attachment position of the front vehicle height sensor 20 and the attachment position of the rear vehicle height sensor 21.

$$\theta = \tan^{-1}((Hf-Hr)/L) \quad (1)$$

The leveling controller 12 includes a vehicle door etc. opening/closing judging unit 22, a vehicle height signal retrieving unit 23, a timer 24, a pitch angle calculation unit 25, a correction angle calculation unit 26, and a drive unit 27.

The vehicle door etc. opening/closing judging unit 22 retrieves signals from each switch 14 to 19 of the switch and sensor group 11, and judges whether or not one or more doors of the doors of the vehicle are opened or whether or not all the doors are closed based on the signals. The vehicle height signal retrieving unit 23 monitors the vehicle height signals (Hf, Hr) output from the front vehicle height sensor 20 and the rear vehicle height sensor 21, and retrieves such signals when the respective signals indicate a change of greater than or equal to a predetermined value. The timer 24 times (counts) the predetermined time value. The pitch angle calculation unit 25 calculates the pitch angle θ based on the vehicle height signals retrieved by the vehicle height retrieving unit 23, and the correction angle calculation unit 26 calculates the correction angle in the direction of canceling out the pitch angle θ. The drive unit 27 outputs a drive signal corresponding to the correction angle calculated in the correction angle calculation unit 26 to the right lamp ASSY 13R and the left lamp ASSY 13L.

The right lamp ASSY 13R includes a right lamp irradiating direction control unit 28R, a right drive mechanism 29R including an actuator such as a motor, and a right headlight 30R which angle to an upper side and a lower side of a reflector is changed by the right drive mechanism 29R, and similarly, the left lamp ASSY 13L also includes a left lamp irradiating direction control unit 28L, a left drive mechanism 29L including the actuator such as the motor, and a left headlight 30L which angle to the upper side and the lower side of the reflector is changed by the left drive mechanism 29L.

Figure 3:
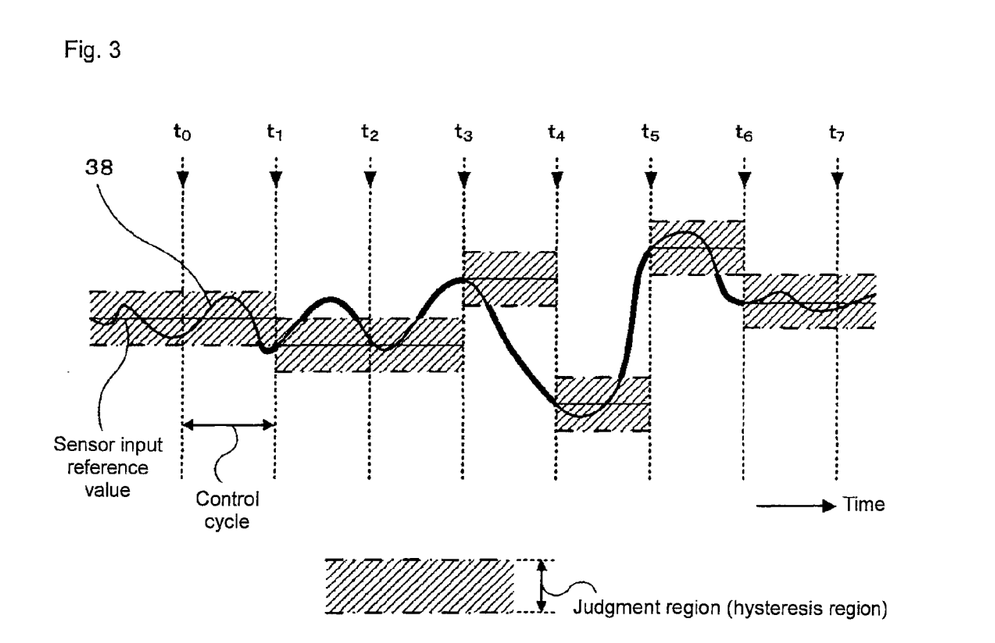
FIG. 3 shows a conceptual view of signal retrieval in a vehicle height signal retrieving unit 23.

FIG. 3 shows a conceptual view of signal retrieval in the vehicle height signal retrieving unit 23. In the figure, a horizontal axis is time, and a period between time t0 to t7 showing control timing is a control cycle of a same time length. A line 38 that fluctuates up and down in the figure represents the detection signal (Hf, Hr) of the front vehicle height sensor 20 or the rear vehicle height sensor 21, and such line 38 fluctuates little by little or greatly up and down in some cases. The fluctuation is caused by various factors. For instance, the fluctuation occurs when the passenger goes in/out or when the baggage is being loaded/unloaded while the vehicle is stopped, or occurs by an influence of wind when exposed to strong wind. The fluctuation may also occur when accelerating or decelerating, or when riding over a bump or a pocket of the road surface while traveling.

The detection signal of the front vehicle height sensor 20 or the rear vehicle height sensor 21 is actually always fluctuating slightly or greatly at times, but if all such fluctuations of the detection signal are captured, the pitch angle is frequently adjusted for every control timing (t0, t1, t2, ... ), which may affect the durability of the actuator such as the motor arranged in the drive mechanism (left and right drive mechanism 29R, 29L) of the left and right lamp ASSYs 13R, 13L, and thus it is not preferable. In the present embodiment, retrieval is made only if a large fluctuation of a certain extent is found in the detection signal of the front vehicle height sensor 20 or the rear vehicle height sensor 21 assuming an effective signal fluctuation exists.

Specifically, a judgment region (hysteresis region) having a predetermined upper and lower widths indicated with hatching in the figure is arranged, and retrieval is made assuming an effective signal fluctuation exists only if a signal change exceeding the judgment region is found. Therefore, in the illustrated example, a portion of the line 38 in the judgment region indicated with hatching is ignored, and only the portion of heavy line exceeding the judgment region is retrieved on the assumption that the effective signal fluctuation exists. In the present embodiment, two types of judgment region (hysteresis region) are prepared, one to be applied when the door is opened and one to be applied when the door is closed as described hereinafter, and are respectively referred to as "Hopen" (applied when the door is opened) and "Hclose" (applied when the door is closed).

Specific control operation of the relevant embodiment will be described below using examples.

FIRST EXAMPLE

Figure 4:
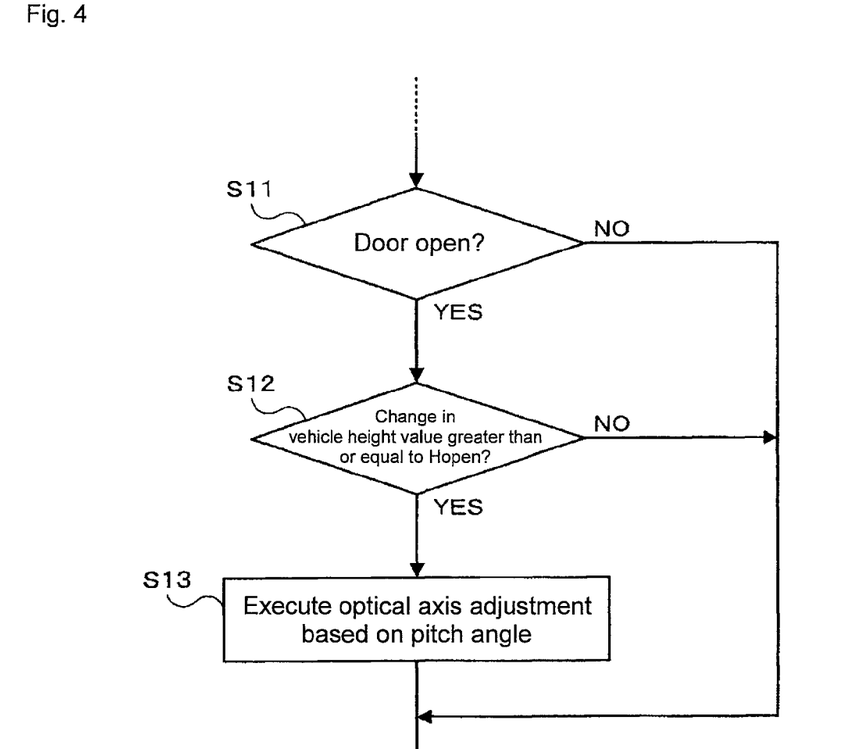
FIG. 4 shows a view of an operation flow in a first example.

FIG. 4 shows a view of an operation flow in a first example. In this example, the opening/closing of the doors (driver seat door, passenger seat door, back seat right door, back seat left door, hatching gate, trunk) is judged by the vehicle door etc. opening/closing judging unit 22 (step S11), where when judged that one or more doors is opened ("YES" in step S11), presumption and judgment are made as being in a situation where the passenger goes in/out or the baggage is being loaded/unloaded, and the change in the pitch angle θ generated during the door opened state is calculated from the detection signals (Hf, Hr) of the front vehicle height sensor 20 and the rear vehicle height sensor 21, and the control amount of each drive mechanism (right drive mechanism 29R and left drive mechanism 29L) of the right lamp ASSY 13R and the left lamp ASSY 13L is determined based on the calculation result, so that the optical axes of the right headlight 30R and the left headlight 30L are adjusted in the direction of canceling out the change in the pitch angle θ (step S12, step S13).

Even if judged that the door is opened, the detection signals (Hf, Hr) of the front vehicle height sensor 20 and the rear vehicle height sensor 21 during the time are not retrieved as is, and are retrieved assuming that an effective signal fluctuation exists only when a signal change exceeding the judgment region (hysteresis: Hopen herein) of predetermined upper and lower widths is present. The reason is as described above, where since the detection signal of the front vehicle height sensor 20 or the rear vehicle height sensor 21 is always fluctuating slightly or greatly at times, if all such fluctuation of the detection signal is captured, the pitch angle θ is frequently adjustment operated for every control cycle, which may affect the durability of the actuator such as the motor arranged in the drive mechanism (left and right drive mechanism 29R, 29L) of the left and right lamp ASSYs 13R, 13L.

According to the first example, the optical axis adjustment based on the pitch angle θ is executed only when the door is opened and when both or one of the detection signals (Hf, Hr) of the front vehicle height sensor 20 and the rear vehicle height sensor 21 exceeds the judgment region (hysteresis region: Hopen herein) of predetermined upper and lower widths, and thus the optical axis adjustment while the vehicle is stopped is performed only under necessary situations, and the headlight optical axis adjustment device 10 achieving further enhancement in durability is provided.

SECOND EXAMPLE

Figure 5:
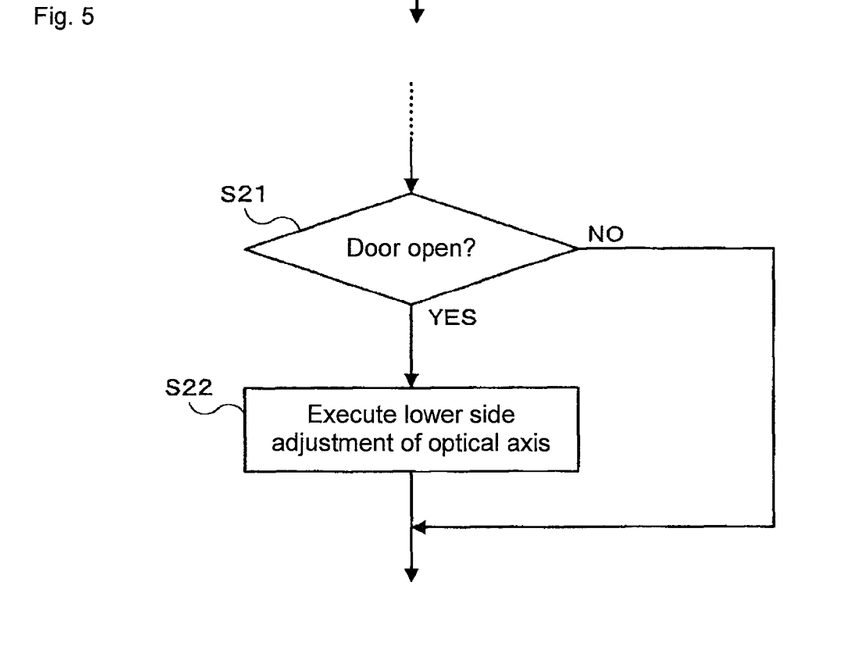
FIG. 5 shows a view of the operation flow in a second example.

FIG. 5 shows a view of an operation flow in a second example. In this example, the opening/closing of the door (driver seat door, passenger seat door, back seat right door, back seat left door, hatchback gate, trunk) is judged by the vehicle door etc. opening/closing judging unit 22 (step S21), where when judged that one or more doors are opened ("YES" in step S21), presumption and judgment are made as being in a situation where the passenger goes in/out or the baggage is being loaded/unloaded, and the optical axes of the right headlight 30R and the left headlight 30L are adjusted to "lower side" (preferably lowermost side) (step S22).

Herein, adjusting the optical axis to "lower side" means the following. Each drive mechanism (right drive mechanism 29R and left drive mechanism 29L) of the right lamp ASSY 13R and the left lamp ASSY 13L moves the optical axis (accurately, tilt angle of reflector) of the right headlight 30R and the left headlight 30L, but the movement amount has a certain limit, and referring the lower limit tilt angle (e.g., −10 degrees) as the lower most side for the sake of convenience, adjusting the optical axis to "lower side" refers to setting the optical axis to one of the angles between horizontal to the lowermost side, and preferably to the lowermost side (lower limit tilt angle). Thus, dazzling on the oncoming vehicles, the pedestrians and the like can be prevented by setting the optical axis to the lower side and the dazzling can be reliably prevented by setting the optical axis at the lowermost side.

According to the second example, the dazzling on the oncoming vehicles and pedestrians can be prevented while avoiding involuntary change (horizontal or upper side change etc.) of the optical axis when the passenger goes in/out or when the baggage is being loaded/unloaded since the optical axis of the headlight is on the lower side (lowermost side in a best preferred mode) when the door is opened. In the first example, after executing the adjustment of the optical axis to the lower side (step S22), a re-execution of the adjustment of the optical axis to the lower side (step S22) is desirably prohibited while being judged that the door is opened. It is useless to again perform the lower side adjustment after adjusting the optical axis to the lower side once as it affects the durability.

THIRD EXAMPLE

Figure 6:
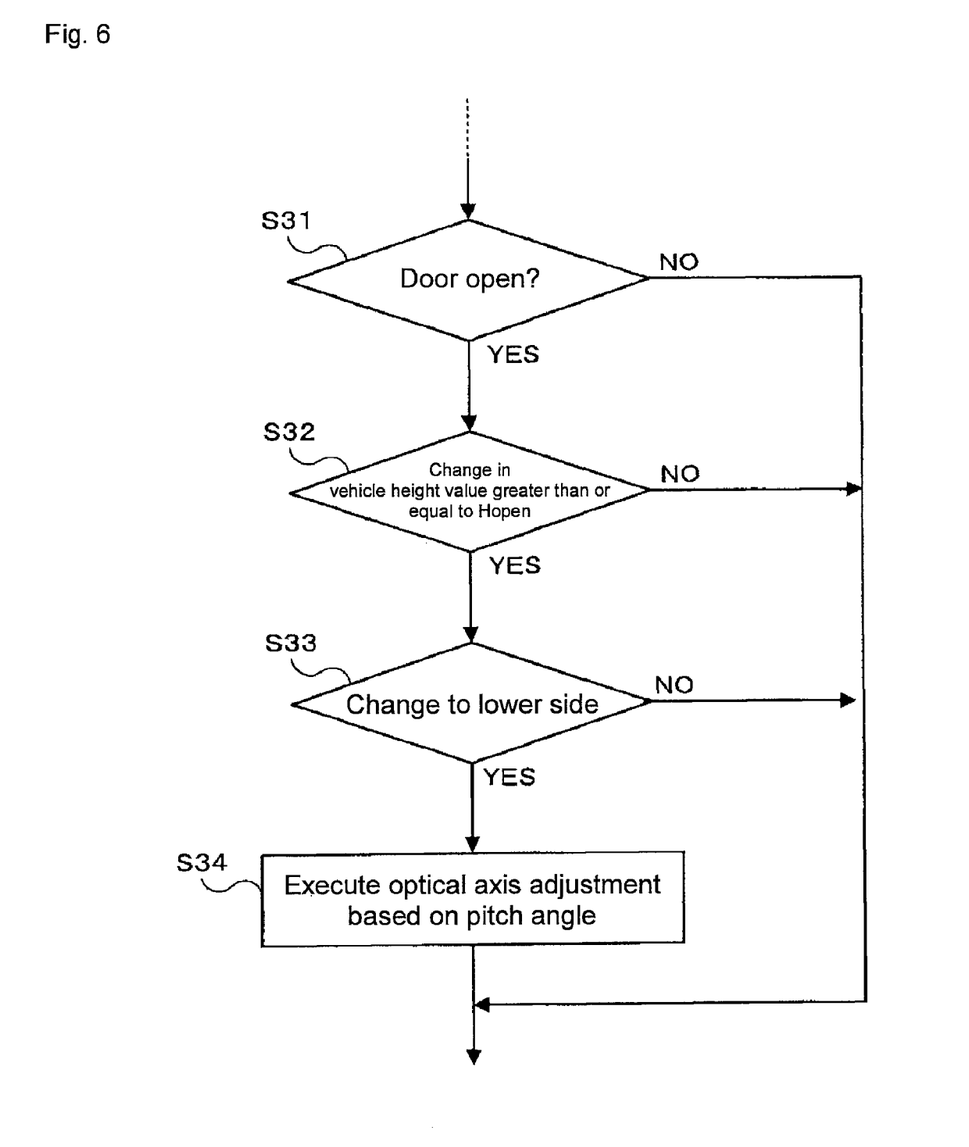
FIG. 6 shows a view of the operation flow in a third example.

FIG. 6 shows a view of an operation flow in a third example. In this example, the opening/closing of the doors (driver seat door, passenger seat door, back seat right door, back seat left door, hatching gate, trunk) is judged by the vehicle door etc. opening/closing judging unit 22 (step S31), where when judged that one or more doors are opened ("YES" in step S31), presumption and judgment are made as being in a situation where the passenger goes in/out or the baggage is being loaded/unloaded, and only the lower side control of the optical axis of the headlight is permitted (step S33) only when both or one of the detection signals (Hf, Hr) of the front vehicle height sensor 20 and the rear vehicle height sensor 21 exceeds the judgment region (hysteresis region: Hopen herein) of predetermined upper and lower widths (step S32), and the optical axes of the right headlight 30R and the left headlight 30L are adjusted (step S34).

In step S33, the reason for "permitting only the lower side control of the optical axis of the headlight" is because the possibility of dazzling the oncoming vehicles and pedestrians increases if the control direction of the optical axis obtained by the change in the detection signal is "upper side" even if both or one of the detection signals (Hf, Hr) of the front vehicle height sensor 20 and the rear vehicle height sensor 21 exceeds the judgment region (hysteresis region: Hopen herein) of predetermined upper and lower widths, where such drawback can be resolved by performing the optical axis control limited only to the lower side.

Therefore, according to the third example, since only the lower side control of the optical axis of the headlight is permitted when the door is opened and when both or one of the detection signals (Hf, Hr) of the front vehicle height sensor 20 and the rear vehicle height sensor 21 exceeds the judgment region (hysteresis region: Hopen herein) of predetermined upper and lower widths, the optical axis adjustment while the vehicle is stopped is performed only under necessary situations, whereby the durability further enhances, and the dazzling on the oncoming vehicles and pedestrians can be reliably prevented.

FOURTH EXAMPLE

Figure 7:
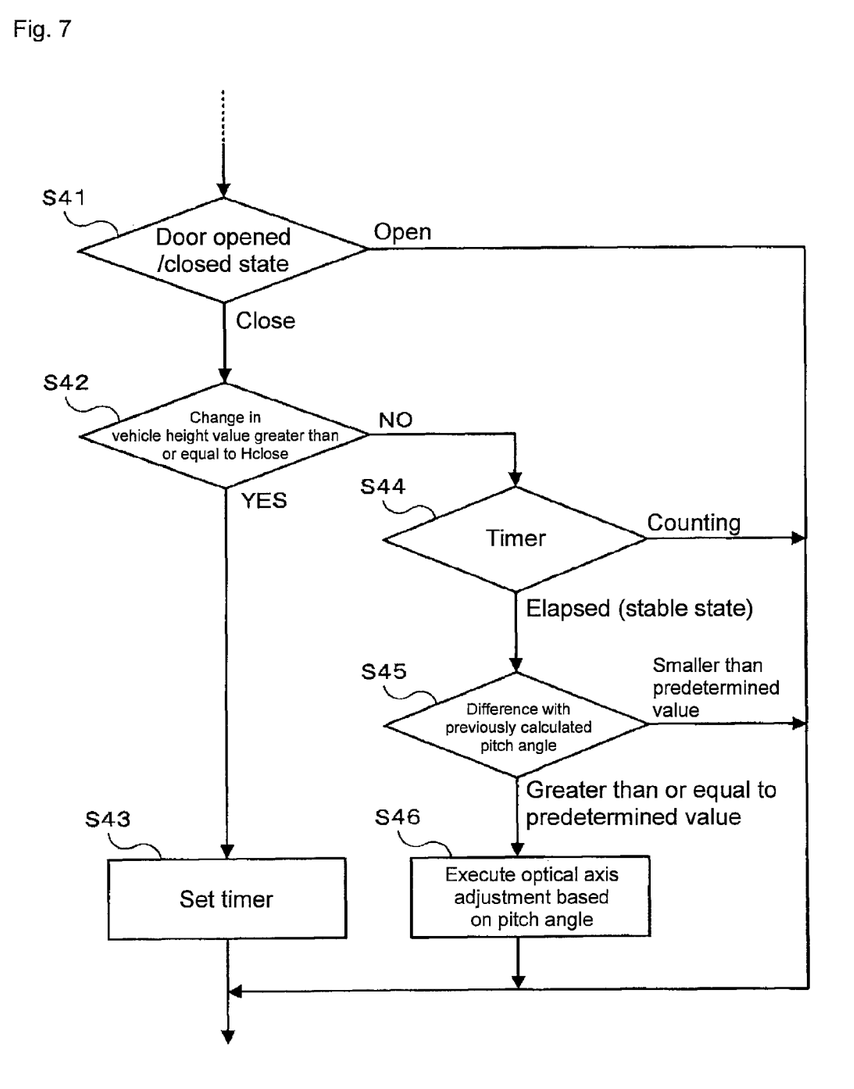
FIG. 7 shows a view of the operation flow in a fourth example.

FIG. 7 shows a view of an operation flow in a fourth example. In the examples above (first example to third example), the optical axis adjustment is performed when the door is in the "opened" state, but the fourth example differs in that the optical axis adjustment is performed when the door is in the "closed" state.

In other words, in this example, the opening/closing of the doors (driver seat door, passenger seat door, back seat right door, back seat left door, hatching gate, trunk) is judged by the vehicle door etc. opening/closing judging unit 22 (step S41), where when judged that all the doors are closed ("YES" in step S41), judgment is made on whether or not both or one of the detection signals (Hf, Hr) of the front vehicle height sensor 20 and the rear vehicle height sensor 21 exceeds the judgment region (hysteresis region: Hclose herein) of predetermined upper and lower widths (step S42). If the judgment region is exceeded, the timer 24 is set (step S43), and if not exceeded, determination on whether the counter 24 is counting is made (step S44). The timer 24 is a counting device for periodically counting the values, and the setting of the timer 24 refers to starting the counting operation.

If the timer 24 is elapsed (count value reaches a predetermined value), the difference with the previously calculated pitch angle is obtained, and whether or not such difference is greater than or equal to a predetermined value is determined (step S45), and the optical axis adjustment based on the pitch angle θ is executed when greater than or equal to the predetermined value (step S46).

According to the fourth example, when the door is in the closed state, if the difference between the pitch angle for this time calculated by the detection signal exceeding the Hclose of the front vehicle height sensor 20 and the rear vehicle height sensor 21 and the pitch angle used in the optical axis adjustment of the previous time is changed by greater than or equal to a predetermined value and if such change continued for a predetermined time (counting time of timer 24), determination is made that the change of the pitch angle is in a stable state and the optical axis of the headlight is adjusted, and thus the optical axis adjustment of the headlight is not performed on the instantaneous or temporary pitch angle change, whereby the durability of the actuator can be enhanced. For instance, when the pitch angle continuously changes for a certain time such as when one wheel runs on a curb while being stopped, the optical axis adjustment of the headlight is performed thereby preventing the dazzling on the oncoming vehicles and pedestrians.

FIFTH EXAMPLE

Figure 8:
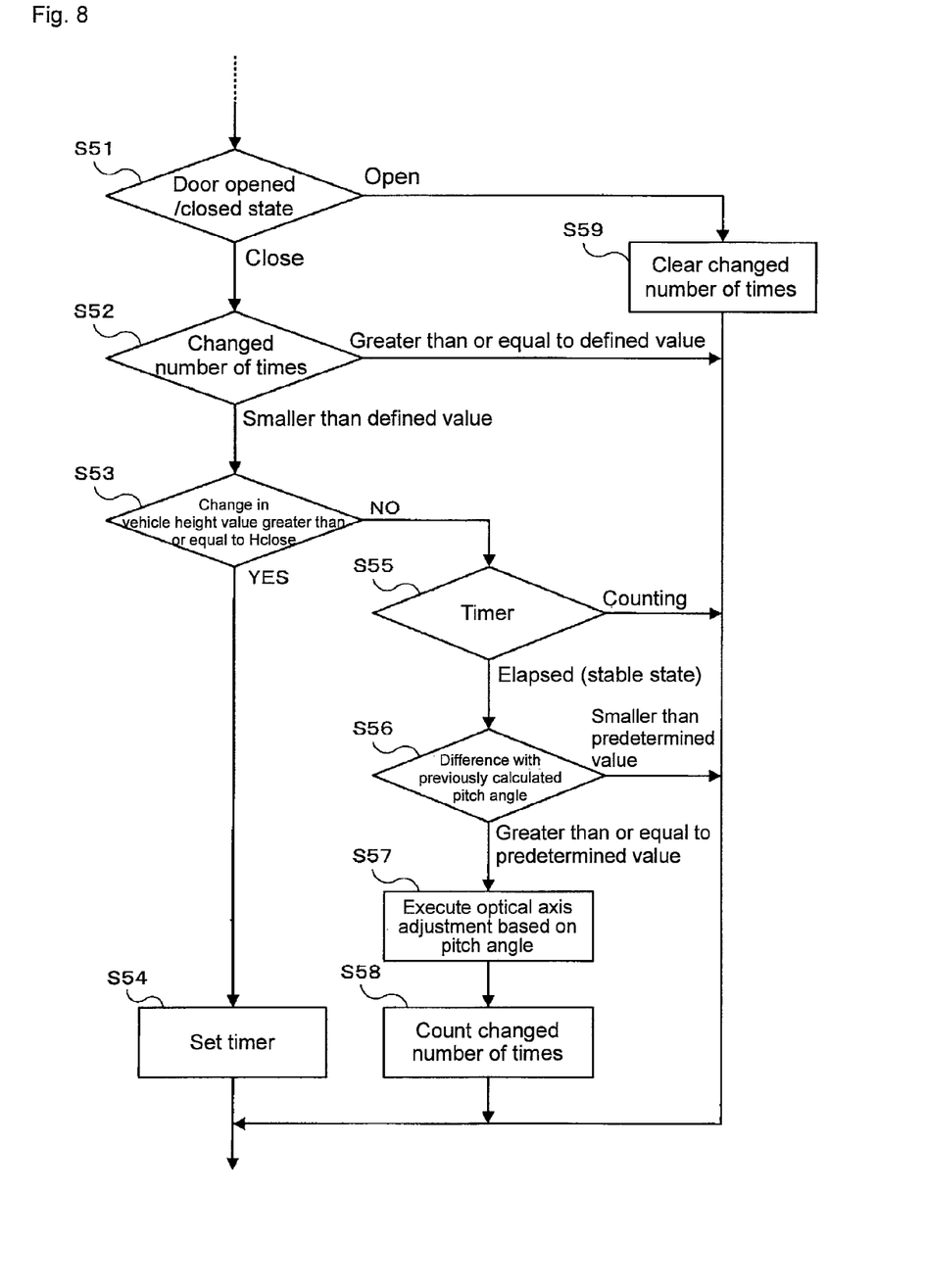
FIG. 8 shows a view of the operation flow in a fifth example.

FIG. 8 shows a view of an operation flow in a fifth example. In the fifth example as well, the optical axis adjustment is performed when the door is in the "closed" state similar to the fourth example.

In other words, in this example, the opening/closing of the doors (driver seat door, passenger seat door, back seat right door, back seat left door, hatching gate, trunk) is judged by the vehicle door etc. opening/closing judging unit 22 (step S51), where a later-described "changed number of times" (number of executions of the optical axis adjustment based on the pitch angle θ while the door is closed) is cleared (step S59) when judged that one or more doors are opened ("opened" in step S51), and whether or not the later-described "changed number of times" is smaller than the defined number of times is determined (step S52) when judged that all the doors are closed ("closed" in step S51). If smaller than the defined number of times, whether or not both or one of the detection signals (Hf, Hr) of the front vehicle height sensor 20 and the rear vehicle height sensor 21 exceeds the judgment region (hysteresis region: Hclose herein) of predetermined upper and lower widths is determined (step S53). If the judgment region is exceeded, the timer 24 is set (step S54), and if not exceeded, determination on whether the counter 24 is counting is made (step S55). The timer 24 is a counting device for periodically counting the values, and the setting of the timer 24 refers to starting the counting operation.

If the timer 24 is elapsed (count value reaches a predetermined value), the difference with the previously calculated pitch angle is obtained, whether or not such difference is greater than or equal to a predetermined value is determined (step S56), and the optical axis adjustment based on the pitch angle θ is executed when greater than or equal to the predetermined value (step S57), and thereafter the "changed number of times" is counted (step S58). The "changed number of times" is cleared (initialized) when the door is opened (step S59).

According to the fifth example, the number of executions of the optical axis adjustment based on the pitch angle θ while the door is closed is counted as the "changed number of times", and the optical axis adjustment of the headlight is performed only when the "changed number of times" is smaller than the defined value. Specifically, if the difference between the pitch angle for this time calculated by the detection signal exceeding Hclose of the front vehicle height sensor 20 and the rear vehicle height sensor 21 and the pitch angle used in the optical axis adjustment of the previous time is changed by greater than or equal to a predetermined value, and if such change continued for a predetermined time (counted time of timer 24), determination is made that the change in pitch angle is in a stable state and the optical axis of the headlight is adjusted.

Therefore, similar to the fourth example, the durability of the actuator can be further enhanced so as not to perform the optical axis adjustment of the headlight on instantaneous or temporary pitch angle change, and for example, when the pitch angle continuously changes for a certain time such as when one wheel runs on the curb while being stopped, the optical axis adjustment of the headlight is performed thereby preventing dazzling on the oncoming vehicles and pedestrians, and in addition, the optical adjustment is prevented from being further performed when the number of executions ("changed number of times") of the optical axis adjustment becomes greater than the defined value, and the durability of the actuator can be further enhanced.

SIXTH EXAMPLE

Figure 9:
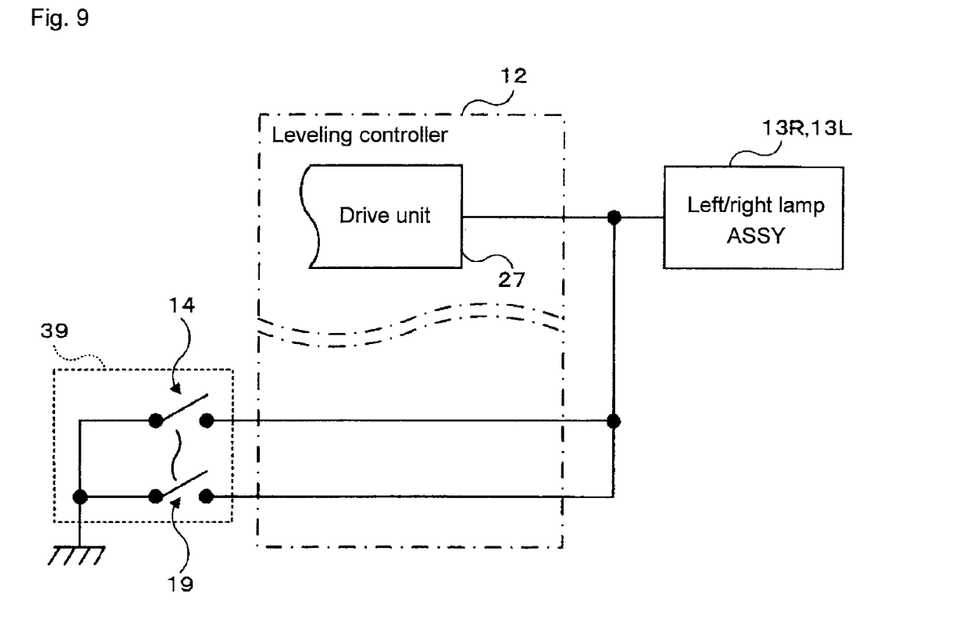
FIG. 9 shows a block diagram of main elements in a sixth example.

FIG. 9 shows a configuration of main elements in the sixth example. In the figure, a switch group 39 includes each door switch of FIG. 1 (driver seat door switch 14, passenger seat door switch 15, back seat right door switch 16, back seat left door switch 17, hatchback gate switch 18, trunk switch 19) (in the figure, the driver seat door switch 14 and trunk switch 19 are representatively shown in the figure). All the switches 14 to 19 are connected in parallel between a ground and an output of a drive unit 27 of the leveling controller 12, and when at least one of the switches 14 to 19 is turned ON (i.e., when one or more doors are opened), the output of the leveling controller 27, that is, a correction value for the optical axis adjustment applied on the left and right lamps ASSY 13R, 13L drops to a ground potential (0V). The left and right lamps ASSY 13R, 13L set the optical axis of the headlight to a predetermined tilt angle corresponding to 0V when "0V" is given as the correction value for optical axis adjustment.

According to the sixth example, "when detected that the door is opened, the optical axis adjustment is prohibited until detected that the door is closed the next time", and specifically, the optical axis adjustment is not performed while the door is detected as opened even if the pitch angle is changed with the going in/out of the passenger and the loading/unloading of the baggage (precisely, fixing the optical axis of the headlight to a predetermined tilt angle), and the optical axis adjustment is permitted when the door is closed, so that the durability can be enhanced by avoiding unnecessary operation of the actuator, and the desired optical axis adjustment can be performed at the point the door is closed, thereby preventing dazzling on the oncoming vehicles and pedestrians by inappropriate optical axis. Here, the ground potential (0V) is given to the left and right lamps ASSY 13R, 13L when the door is open, but is not limited thereto. The potential merely needs to be that which can set the optical axis to the tilt angle that does not dazzle the drivers of oncoming vehicles and pedestrians, and may be potentials other than 0V as long as such condition is satisfied.

SEVENTH EXAMPLE

Figure 10:
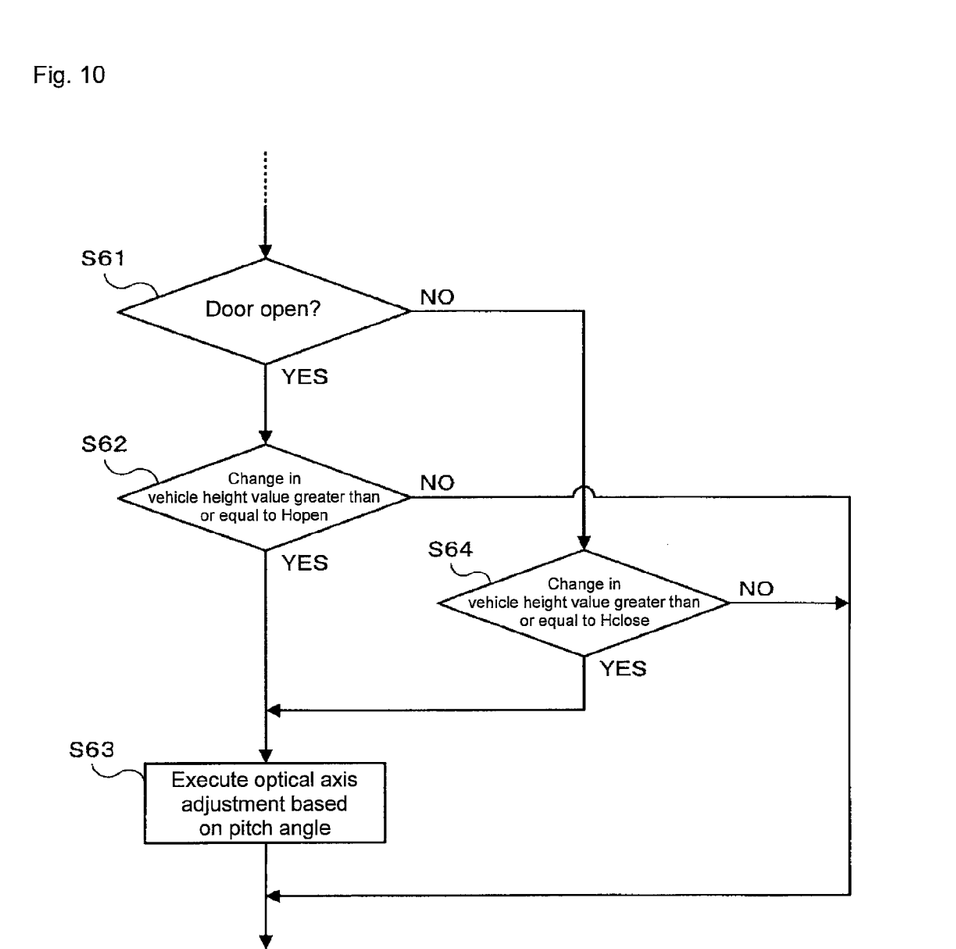
FIG. 10 shows a view of the operation flow in a seventh example.

FIG. 10 shows a view of an operation flow in a seventh example. In this example, the opening/closing of the doors (driver seat door, passenger seat door, back seat right door, back seat left door, hatching gate, trunk) is judged by the vehicle door etc. opening/closing judging unit 22 (step S61), where when judged that one or more doors are opened ("YES" in step S61), whether or not both or one of the detection signals (Hf, Hr) of the front vehicle height sensor 20 and the rear vehicle height sensor 21 exceeds the judgment region (door open hysteresis region: Hopen herein) of predetermined upper and lower widths is judged (step S62), where when not judged that one or more doors are opened ("NO" in step S61), whether or not both or one of the detection signals (Hf, Hr) of the front vehicle height sensor 20 and the rear vehicle height sensor 21 exceeds the judgment region (door close hysteresis region: Hclose herein) of predetermined upper and lower widths is determined (step S64).

In a case where the door is opened or the door is closed, if both or one of the detection signals (Hf, Hr) of the front vehicle height sensor 20 and the rear vehicle height sensor 21 exceeds the judgment region (door open→Hopen, door close→Hclose) of predetermined upper and lower widths, the optical axis adjustment based on the pitch angle θ is executed to adjust the optical axes of the right headlight 30R and the left headlight 30L (step S53).

According to the seventh example, by providing the judgment region (hysteresis region) individually for when the door is opened and for when the door is closed, an "allowance" of having a door close judgment region larger than a door open judgment region becomes possible to reduce the number of operations when the door is closed, the number of respective optical axis adjustment for door open and door close becomes suitable thereby enhancing the durability of the actuator and the like.

In the above description, the vehicle height sensor (front vehicle height sensor 20 and rear vehicle height sensor 21) is arranged near the front and back axle to obtain a behavior change amount (vehicle height) of the vehicle necessary for calculating the pitch angle θ, but is not limited thereto, and the vehicle height sensor may be arranged on only one of near the front or the back axle. That is, one of either the front vehicle height sensor 20 or the rear vehicle height sensor 21 may be arranged. The pitch angle θ can be obtained by calculation based on the vehicle height (one of Hf or Hr) detected with one vehicle height sensor. For instance, Japanese Patent No. 3850943 discloses a method of obtaining the pitch angle using a measurement value of the one vehicle height sensor and a load distribution of the vehicle, and such method may be used.

If the vehicle is stopped at a location with a gradient such as a hill, the pitch angle θ of the vehicle changes with such gradient, but in the present embodiment, the optical axis adjustment of the headlight is not performed on the change in the pitch angle θ generated by such gradient. The reason is because the optical axis adjustment is performed limited only when the detection value of the vehicle height sensor exceeds a constant range (range of hysteresis region) (during the control cycle), and in addition, when the optical axis adjustment is performed, the correction value is calculated by a "displacement amount" of the detection value of the front vehicle height sensor 20, a "displacement amount" of the detection value of the rear vehicle height sensor 21, and a wheel base width (see reference numeral L of FIG. 2). Therefore, only "displacement amount compared to the start of measurement for this time" of the vehicle height measurement value becomes important, and the adjustment of the optical axis is not influenced by the gradient of the road.

What is claimed is:

1. A headlight optical axis adjustment device for adjusting an optical axis of a headlight based on a pitch angle of a vehicle; the headlight optical axis adjustment device comprising:
    an opened/closed state detection section for detecting an opened/closed state of an open/close unit where the opened state is when a door, trunk, or hatching gate of the vehicle is open;
    an operation change detection section for detecting at specified time intervals changes in operation of said vehicle necessary for calculating said pitch angle;
    a pitch angle calculating section for calculating said pitch angle according to the operation changes detected by said operation change detection section;
    an optical axis adjustment permitting section for permitting optical axis adjustment of the headlight optical axis if a first hysteresis judgment region which is to be applied when an opened state of said open/close unit is being detected by said opened/closed state detection section is preliminarily set and when said opened/closed state detection section is currently detecting said open/close unit to be in said opened state and a current value of said pitch angle calculated by said pitch angle calculating section has changed from the previous value by more than said first hysteresis judgment region corresponding to said open state, based on said current value of the pitch angle;
    the optical axis adjustment permitting section also permitting optical axis adjustment of the headlight optical axis, if a second hysteresis judgment region which is to be applied when a closed state of said open/close unit is being detected by said opened/closed state detection section is preliminarily set and when said opened/closed state detection section is currently detecting said open/close unit to be in said closed state and a current value of said pitch angle calculated by said pitch angle calculating section has changed from the previous value by more than said second hysteresis judgment region corresponding to said closed state, according to said current value of the pitch angle calculated by said pitch angle calculating section; and a first optical axis adjustment execution section for executing the optical axis adjustment.

2. The headlight optical axis adjustment device according to claim 1, wherein the first optical axis adjustment execution section does not execute further optical axis adjustment when executed number of times of the optical axis adjustment becomes greater than a predetermined number of times.

* * * * *